United States Patent
Sun et al.

(10) Patent No.: US 7,164,643 B2
(45) Date of Patent: Jan. 16, 2007

(54) DATA EXTRACTION FOR AN OPTICAL DISC DRIVE

(75) Inventors: Yu-Hung Sun, Taipei (TW); Chih-Hao Chang, Taipei (TW)

(73) Assignee: Lite-On IT Corporation, Taipei (TW)

( * ) Notice: Subject to any disclaimer, the term of this patent is extended or adjusted under 35 U.S.C. 154(b) by 576 days.

(21) Appl. No.: 10/774,125

(22) Filed: Feb. 6, 2004

(65) Prior Publication Data

US 2004/0165503 A1    Aug. 26, 2004

(30) Foreign Application Priority Data

Feb. 21, 2003   (TW)   ............................... 92103712 A

(51) Int. Cl.
*G11B 5/09*   (2006.01)

(52) U.S. Cl. ............................... 369/53.35; 369/59.17; 369/47.1

(58) Field of Classification Search ..................... None
See application file for complete search history.

(56) References Cited

U.S. PATENT DOCUMENTS 6,741,530 B1*   5/2004   Turner et al. ............ 369/30.24
2006/0176794 A1*   8/2006   Ueki ......................... 369/53.2

* cited by examiner

*Primary Examiner*—Muhammad Edun
(74) *Attorney, Agent, or Firm*—Thomas, Kayden, Horstemeyer & Risley

(57) ABSTRACT

A method of increasing data extraction compatibility for an optical disc drive is disclosed. The method first provides extraction parameter sets, wherein the extraction parameter sets comprise a first extraction parameter set and a second extraction parameter set. The optical disc drive then uses the first extraction parameter set to extract data from an optical disc. Finally, the optical disc drive uses the second extraction parameter set to extract data from the optical disc if a data extraction error occurs.

12 Claims, 7 Drawing Sheets

DATA EXTRACTION FOR AN OPTICAL DISC DRIVE

BACKGROUND OF THE INVENTION

1. Field of the Invention

The present invention relates to the data extraction from optical discs. More specifically, to a method of increasing data extraction compatibility for an optical disc drive.

2. Description of the Related Art

With the progress of computer hardware related technology and the popularization of optical disc drives, the utilization of optical discs has become part of daily life. Thus, optical disc variety has increased dramatically, such as CD-ROM, CD-R, CD-RW, DVD-R, and DVD-RW. The present optical disc drives mainly utilizes different data extraction mechanisms to extract data from optical discs with different formats. However, optical discs of different manufacturing processes may issue different optical signals when an optical disc drive extracts data therefrom, irrespective of whether the recorded data is in the same format. For example, optical discs manufactured with different dyes or different reflective materials may issue different optical signals when read. As a result, the optical disc drive may have a poor data extraction compatibility for certain optical discs, in some cases even fail to extract data from the optical discs.

Conventionally, due to the limitation of the width of data tracks and the distance between data tracks, optical disc drives have to apply tracking servo systems to locate the optical pick up head on certain data track in an optical disc when execute data extraction. The optical pick up head usually fails to extract data from data tracks and causes data extraction errors because of the difference of discs, such as quality, material, or signal decay of discs. Some data extraction errors can be corrected by error correction operations, while some others cannot. When the error correction operations cannot fix the data extraction errors, the optical disc drives may retry or lower data extraction speed to extract data or obtain better signal quality.

FIG. 1 is a flowchart of retry operations implemented by conventional optical disc drives. After sending a data extraction request to an optical disc drive, a host waits for the optical disc drive to send back the requested data within a predetermined time period. If the optical disc drive fails to send back the requested data within the predetermined time period, it will send an extraction failure notice to the host. If the host does not receive the extraction failure notice, the host considers the optical disc drive as ineffective. Under certain conditions, the host may halt because the optical disc drive does not return an extraction failure notice. However, if the extraction is assessed as failed, the host can sends data extraction request again to the optical disc drive for data extraction.

In Step 100 the retry count value is set to 0, and time count starts.

In Step 101 the retry count value is increased by 1 if a data extraction error occurs.

In Step 102, if the retry count value is less than a predetermined value, the process proceeds to Step 103, otherwise the process proceeds to Step 108.

In Step 103 the data extraction is retried.

In Step 104, the data extraction is determined as successful or not. If the data extraction is determined as successful, the process proceeds to Step 105, otherwise the process proceeds to Step 106.

In Step 105 the data extraction is successful and the requested data is returned. The retry count value is reset to 0.

In Step 106, the used data extraction time is determined if it is less than a predetermined time period. If the used data extraction time is determined less than the predetermined time period, the process proceeds to Step 101, otherwise the process proceeds to Step 107.

In Step 107 the data extraction operation is assessed as failed.

In Step 108 the data extraction speed of the optical disc drive is lowered and the retry count value is reset to 0.

When an optical disc drive receives a data extraction request from a host and starts to extract data from a CD, the optical disc drive sets the retry count value to 0 and time count is begun (Step 100). When a data extraction error occurs, the retry count value is increased by 1 (Step 101). If the retry count value is more than a predetermined value, the data extraction speed of the optical disc drive is lowered and the retry count value is initialized to 0 (Step 108). The data extraction is then retried (Step 103). If the retry count value is not more than the predetermined value, the data extraction is retried directly (Step 103). Afterwards, the data extraction is determined as successful or not (Step 104). If the data extraction is determined as successful, the extracted data is returned to the host (Step 105). Otherwise, the used data extraction time is determined if it is less than a predetermined time period (Step 106). If the used data extraction time is more then or equal to the predetermined time period, representing the data extraction failure (Step 107), otherwise the retry count value is increased by 1 (Step 101), and the described data extraction operations carry on.

Nevertheless, all optical disc drives accomplish test and adjustment by applying normal optical discs and establish data extraction parameters accordingly. Thus, if a data extraction error occurs, the optical disc drives only can utilize the established data extraction parameters for retrying. The mentioned conventional data extraction method is not compatible to optical discs with varying qualities, especially for some particular optical discs. Hence, there is a need for a more compatible data extraction method.

SUMMARY OF THE INVENTION

Accordingly, an object of the invention is to provide a data extraction method enabling proper data extracted from a storage medium such as a CD in an optical disc drive.

To achieve the above object, the present invention provides a method of increasing data extraction compatibility for an optical disc drive. The method first provides extraction parameter sets, wherein the extraction parameter sets comprises at least a first extraction parameter set and a second extraction parameter set. The optical disc drive then uses the first extraction parameter set to extract data from an optical disc. Finally, the optical disc drive uses the second extraction parameter set to extract data from the optical disc if a data extraction error occurs.

In addition, the present invention provides another method of increasing data extraction compatibility for an optical disc drive. The method first provides extraction parameter sets. The optical disc drive then selects one extraction parameter set from the extraction parameter sets to extract data from an optical disc if a data extraction error occurs within a predetermined time period.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Next, with reference to the accompanying drawings, an embodiment of the present invention is described.

Figure 1:
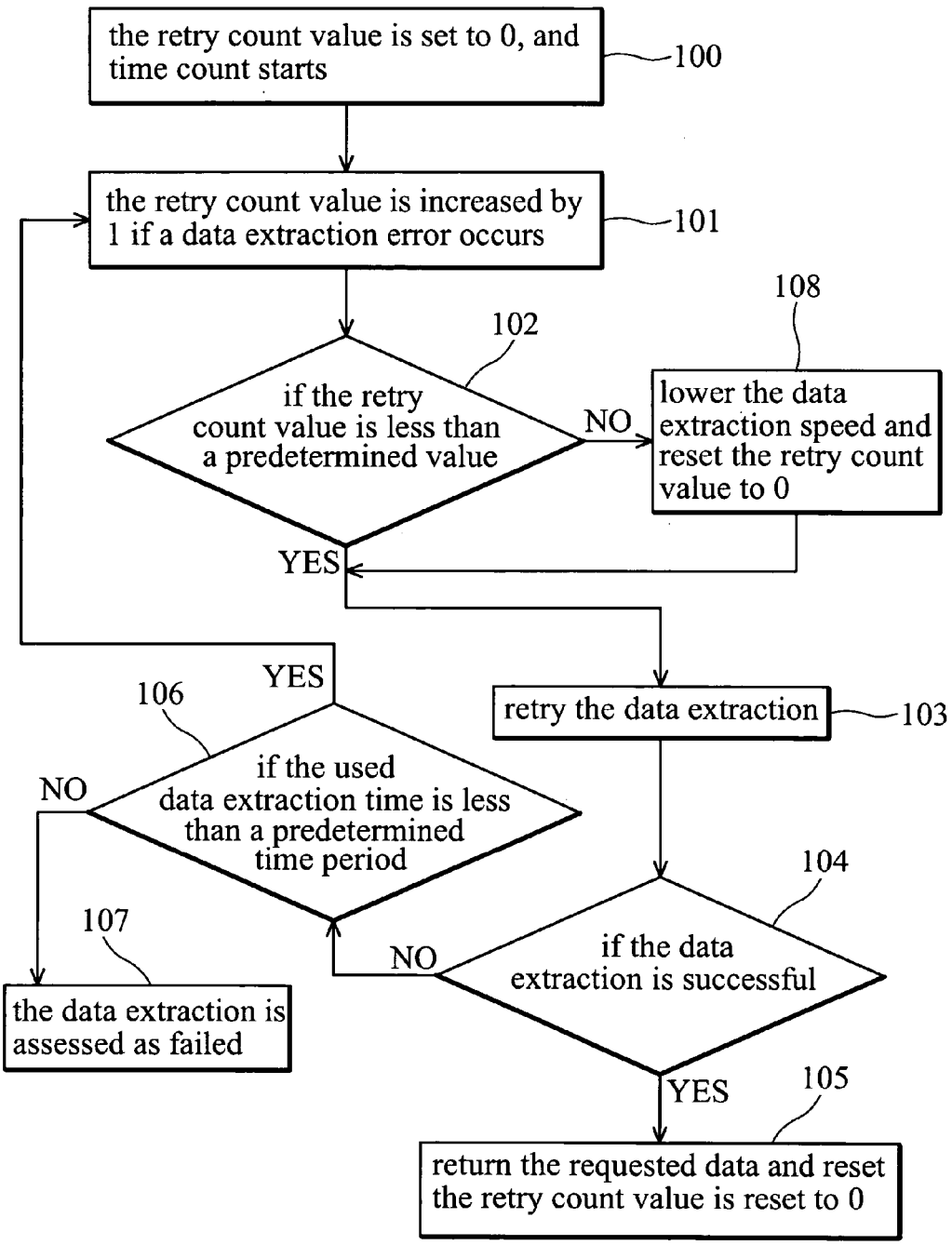
FIG. 1 is a flowchart showing a retry operation implemented by an optical disc drive as referenced in the Related Art.
Figure 2:
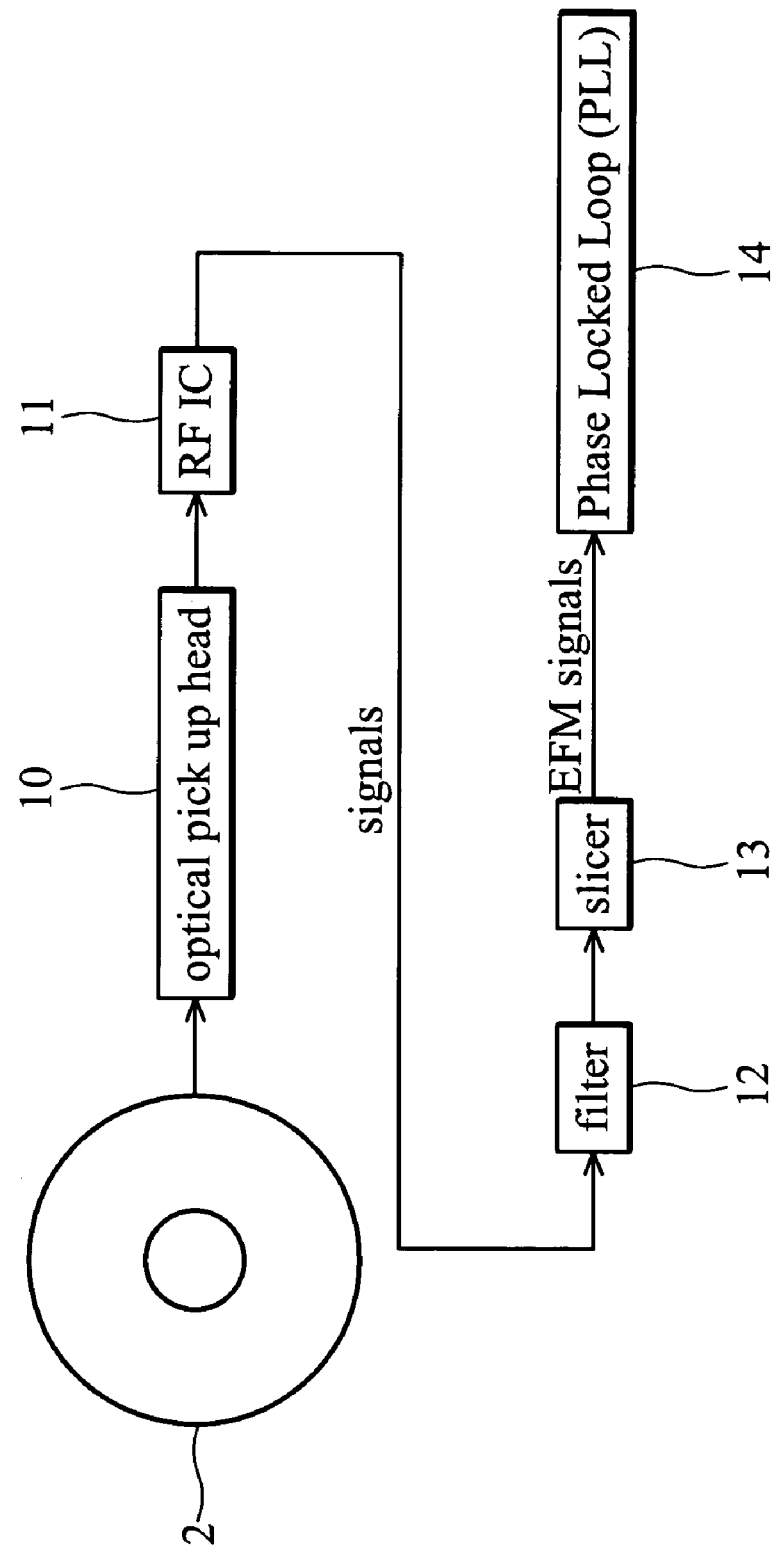
FIG. 2 is a schematic view of the process of data extraction from a CD by an optical disc drive.

FIG. 2 is a schematic view of the process of data extraction from a CD by an optical disc drive. First, an optical pick up head 10 receives laser beam reflected from CD 2, and transforms the optical signals into electrical signals using a photo detector. Then a RF IC 11 amplifies and modifies the electrical signals to a RF signal. Then a filter 12 normalizes the RF signal, and a RF slicer 13 converts the normalized RF signal to obtain an EFM (eight-to-fourteen-modulation) signal corresponding to the 3T to 11T signal. Then a Phase Locked Loop (PLL) 14 locks the EFM signals to form binary data reproduced from the CD.

Abnormal CDs such as CDs with lower quality generate electrical signals with poor electrical qualities compared to those generated by normal CDs. Thus if the optical disc drive reads an abnormal CD with read parameters designed for normal CDs, the data extraction errors will occur much more than usual.

Figure 3:
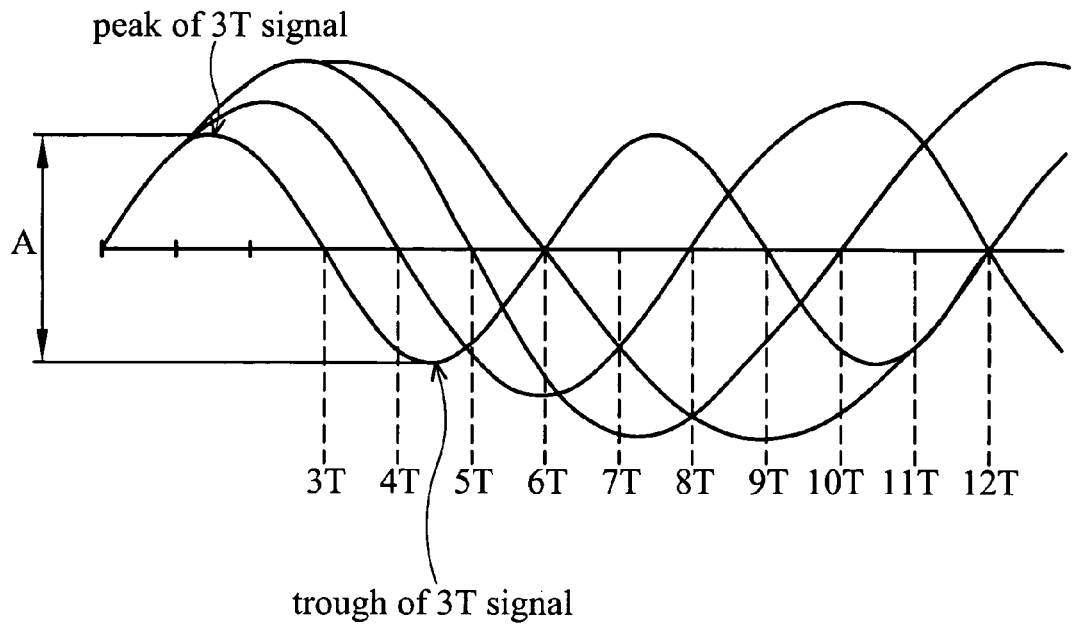
FIG. 3 illustrates the RF signal produced by a normal CD.
Figure 5:
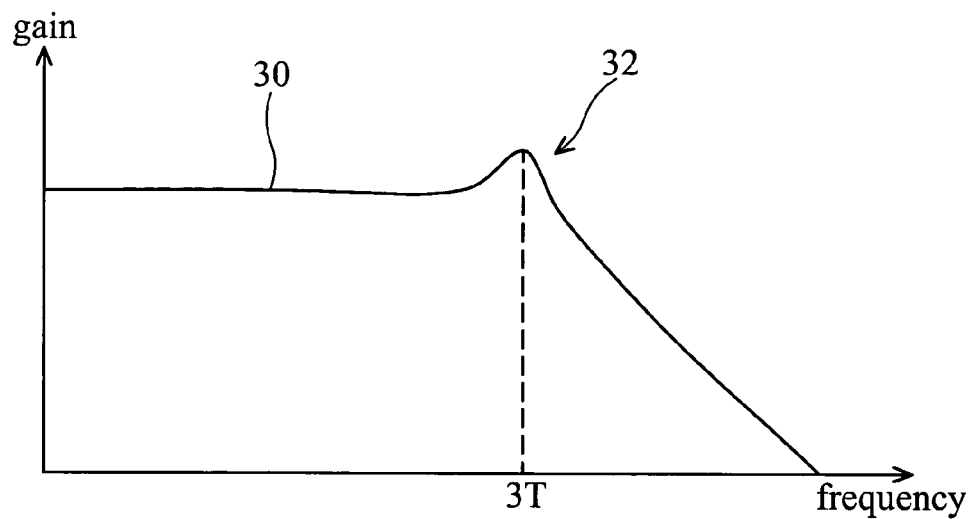
FIG. 5 illustrates the gain spectrum of a filter dealing with a normal CD.

Using FIG. 3 and FIG. 5 as examples, FIG. 3 illustrates the RF signal produced by a normal CD, and FIG. 5 illustrates the gain spectrum of a filter dealing with a normal CD. Generally speaking, the higher frequency part of the RF signal decays comparing with lower frequency part. As illustrated in FIG. 3, among the RF signal, the peak-to-peak amplitude (A) of 3T signal is less than the others. A filter boosts the 3T signal to normalize the amplitudes of various signals within the signal. As illustrated in FIG. 5, the gain curve 30 rises at the frequency of 3T (region 32).

Figure 7:
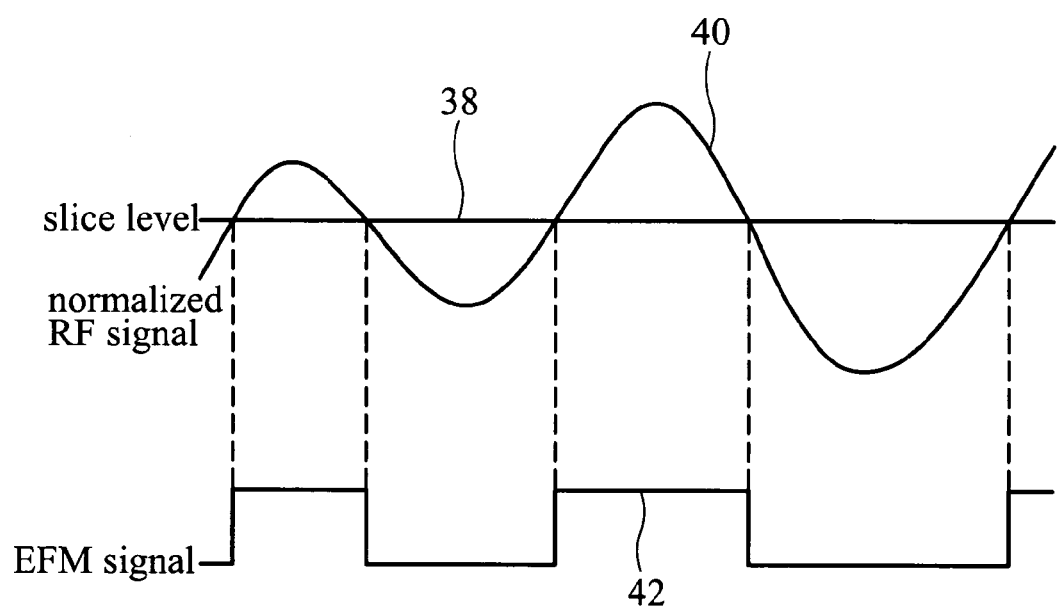
FIG. 7 illustrates the slicing of a normalized RF signal to form an EFM signal.

FIG. 7 illustrates the slicing of a normalized RF signal to form an EFM signal. As described above, the filter normalizes signals of different frequency within the RF signal to generate a normalized RF signal 40. Afterwards, the normalized RF signal is input into a slicer to generate an EFM signal. Because the normalized RF signal 40 comprises signals of uniform amplitude, the slicer can generate an EFM signal easily by shifting the slice level to an appropriate position.

Figure 4:
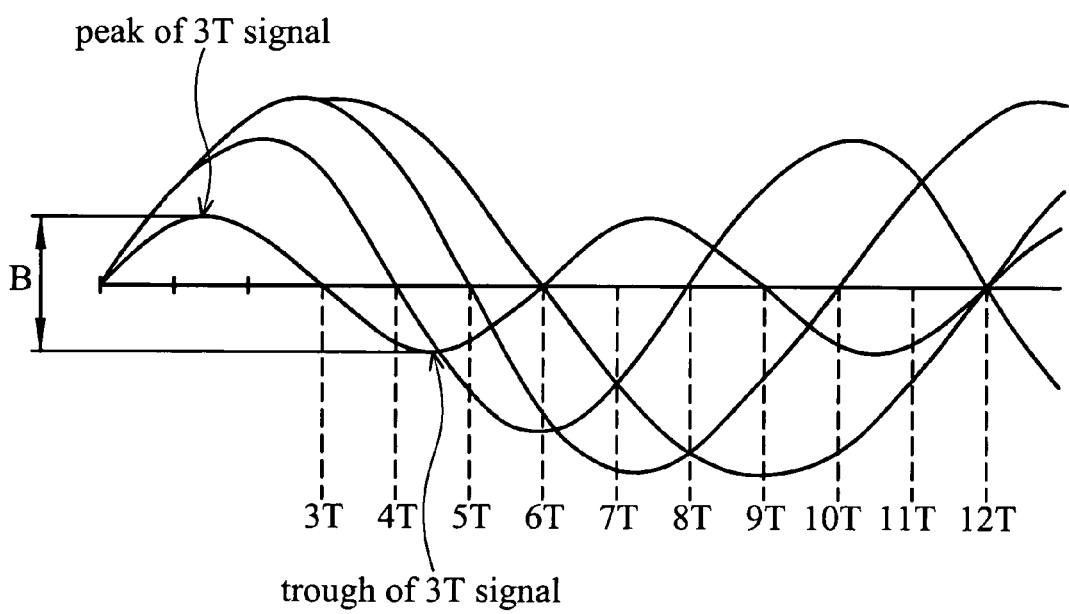
FIG. 4 illustrates the RF signal produced by an abnormal CD.
Figure 6:
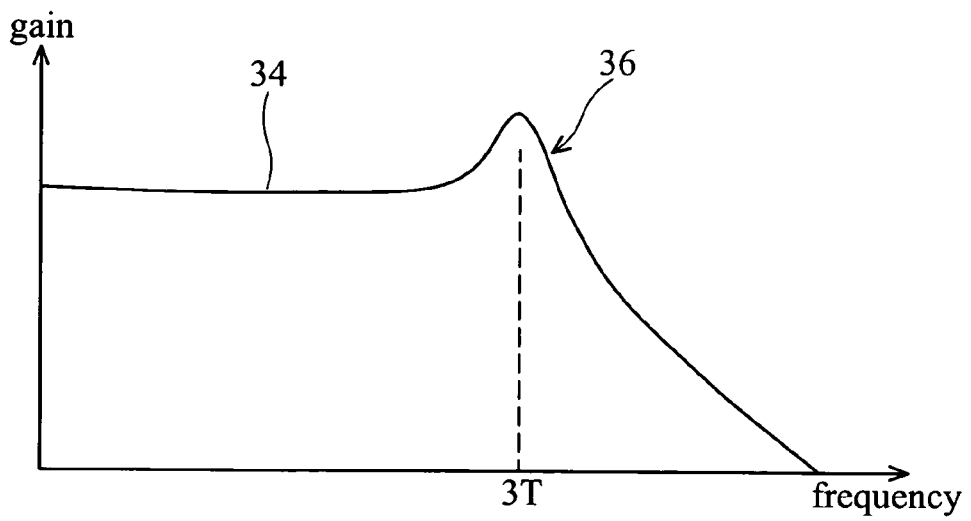
FIG. 6 illustrates the gain spectrum of a filter dealing with an abnormal CD.

FIG. 4 illustrates the RF signal from an abnormal CD. FIG. 6 illustrates the gain spectrum of a filter dealing with an abnormal CD. RF Signal from an abnormal CD may have severe attenuation in the high frequency region. As illustrated in FIG. 4, because of the severe attenuation of the high frequency region of the RF signal, the peak-to-peak amplitude (B) of a 3T signal is quite small compared to other signals of lower frequency. As illustrated in FIG. 6, the gain curve 34 goes much higher at the frequency of 3T (region 36) to compensate for the attenuation.

When a slicer receives a normalized signal from an abnormal CD, it is difficult to adjust the slice level to an appropriate position to generate a normal EFM signal.

Here, only two data extraction parameters are depicted thereon. Actually, varied data extraction parameters are needed for an optical disc drive to extract data from an abnormal CD.

Obviously, the data extraction parameters of normal CDs and abnormal CDs are quite different. If the data extraction parameters of abnormal CDs are not provided, the optical disc drives extract data from abnormal CDs with difficulty.

Therefore, the data extraction compatibility will be increased if varied data extraction parameters are provided in data extraction for an optical disc drive.

Figure 8A:
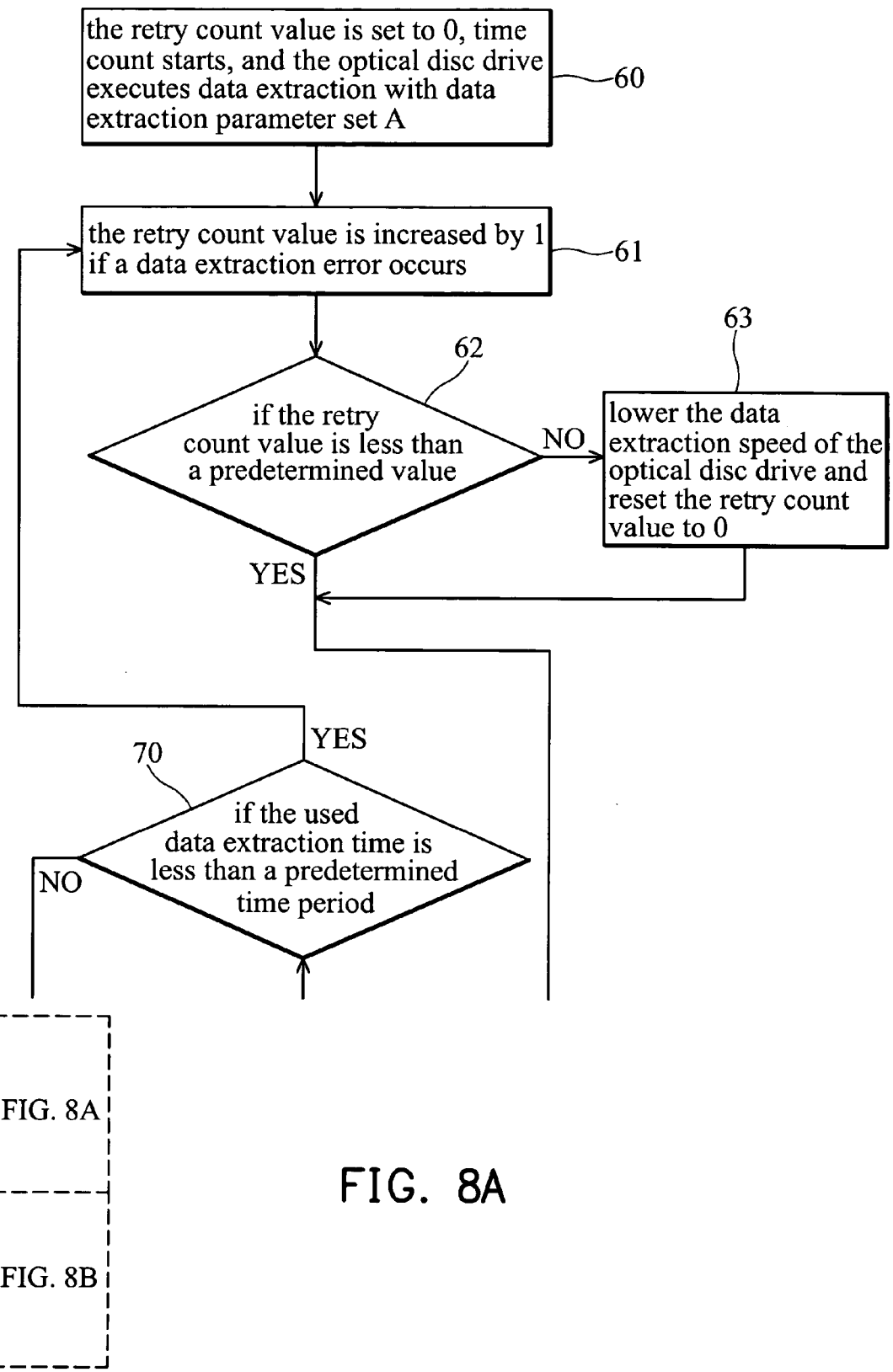
FIG. 8 (including FIGS. 8A and 8B) is a flowchart of a method of increasing data extraction compatibility for an optical disc drive in accordance with an embodiment of the present invention.
Figure 8B:
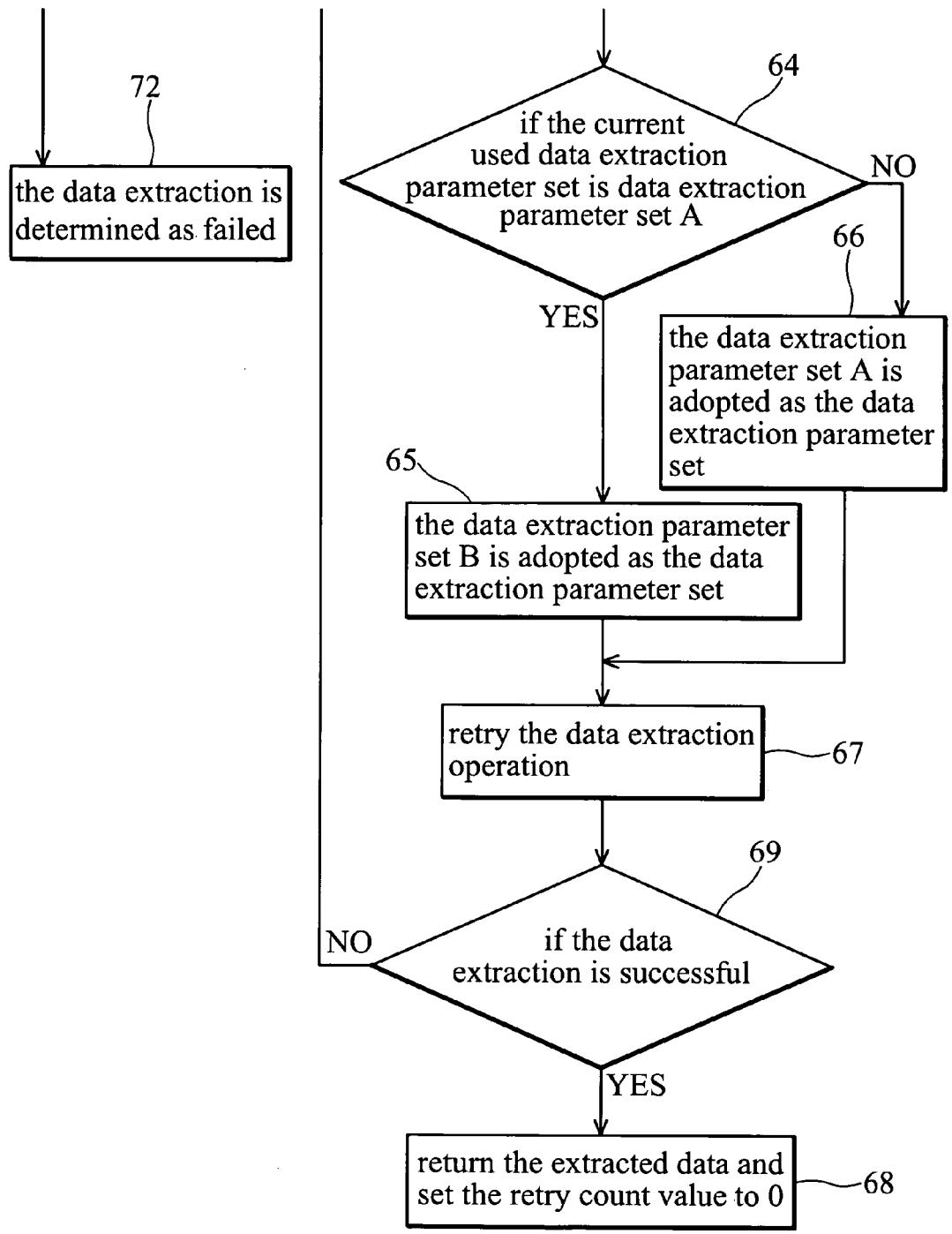

FIG. 8 is a flowchart of a method of increasing data extraction compatibility for an optical disc drive in accordance with an embodiment of the present invention. In one embodiment, the optical disc drive is provided with two sets of data extraction parameters, and the optical disc drive can choose a suitable data extraction parameter set according to the quality of the CD loaded into the optical disc drive.

In Step 60 the retry count value is set to 0, time count starts, and the optical disc drive executes data extraction with data extraction parameter set A.

In Step 61 the retry count value is increased by 1 if a data extraction error occurs.

In Step 62, the retry count value is determined if it is less than a predetermined value. If the retry count value is less than the predetermined value, the process proceeds to Step 64, otherwise the process proceeds to Step 63.

In Step 63 the data extraction speed of the optical disc drive is lowered and the retry count value is reset to 0.

In Step 64, the current used data extraction parameter set is determined if it is data extraction parameter set A. If the current used data extraction parameter set is data extraction parameter set A, the process proceeds to Step 65, otherwise the process proceeds to Step 66.

In Step 65 the data extraction parameter set B is adopted as the data extraction parameter set.

In Step 66 the data extraction parameter set A is adopted as the data extraction parameter set.

In Step 67 the data extraction operation is retried.

In Step 68 the data extraction retrial is successful. The extracted data is returned and the retry count value is set to 0.

In Step 69 it is determined whether the data extraction was successful, and if so, the process proceeds to Step 68, otherwise the process proceeds to Step 70.

In Step 70 it is determined whether the used data extraction time is less than a predetermined time period, and if so, the process proceeds to Step 61, otherwise the process proceeds to Step 72.

In Step 72 the data extraction is determined as failed.

When an optical disc drive receives a data extraction request from a host and starts to extract data from the CD, the optical disc drive sets the retry count value to 0, time count is begun and executes the data extraction in accordance with data extraction parameter set A (Step 60). When a data extraction error occurs, the retry count value is increased by 1 (Step 61) If the retry count value is more than a predetermined value, the data extraction speed of the optical disc drive is lowered, the retry count value is initialized to 0 (Step 63), and Step 64 is then executed. If the retry count value does not exceed the predetermined value, Step 63 is proceeded directly.

Step 64 through Step 66 comprise data extraction parameter sets switching. If the current used data extraction parameter set is the data extraction parameter set A, data extraction parameter set B is adopted to execute further data extraction (Step 65). If the current used data extraction parameter set is not the data extraction parameter set A, the data extraction parameter set A is adopted to execute further data extraction (Step 66).

Carrying on, the optical disc drive executes the data extraction retrial with the adopted data extraction parameter set (Step 67). It is then determined whether the data extraction was successful (Step 69), and if so, the extracted data is returned to the host directly (Step 68). If the data extraction fails, it is determined whether the used data extraction time is less than a predetermined time period (Step 70). If the used data extraction time is more than or equal to the predetermined time period, the data extraction is considered as failed (Step 72), and if less, the retry count: value is increased by 1 and the data extraction proceeds (Step 61).

The present invention provides varied data extraction parameter sets in advance and selects different data extraction parameter sets to extract data in a limited time period.

Thus, the present invention provides a novel method to overcome the conventional data extraction, compatible problems, increasing the entire utilization for an optical disc drive.

When the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of increasing data extraction compatibility for an optical disc drive, comprising:
    providing a plurality of extraction parameter sets, wherein the extraction parameter sets comprise at least a first extraction parameter set and a second extraction parameter set;
    using the first extraction parameter set to extract data from an optical disc; and
    using the second extraction parameter set to extract data from the optical disc if a data extraction error occurs.

2. The method as claimed in claim 1, wherein the first parameter set is dealing with a normal optical disc and the second extraction parameter set is dealing with an abnormal optical disc.

3. The method as claimed in claim 1, further comprising lowering data extraction speed of the optical disc drive if a number of the data extraction error exceeds a predetermined value.

4. The method as claimed in claim 1, further comprising assessing the optical disc drive as data extraction failure from the optical disc if the data extraction time exceeds a predetermined period.

5. The method as claimed in claim 1, wherein the extraction parameter sets comprise a specific boosted gain for a 3T frequency signal.

6. The method as claimed in claim 1, wherein the extraction parameter sets comprise an adjustment of slice level of a normalized RF signal.

7. A method of increasing data extraction compatibility for an optical disc drive, comprising:
    providing a plurality of extraction parameter sets; and
    selecting one extraction parameter set from the extraction parameter sets to extract data from an optical disc if a data extraction error occurs within a predetermined time period.

8. The method as claimed in claim 7, wherein the extraction parameter sets comprise one extraction parameter set for a normal optical disc and one extraction parameter set for an abnormal disc.

9. The method as claimed in claim 7, further comprising lowering data extraction speed of the optical disc drive if a number of the data extraction error exceeds a predetermined value.

10. The method as claimed in claim 7, further comprising identifying the optical disc drive fails to extract data from the optical disc if the data extraction time exceeds the predetermined time period.

11. The method as claimed in claim 7, wherein the extraction parameter sets comprise a specific boosted gain for a 3T frequency signal.

12. The method as claimed in claim 7, wherein the extraction parameter sets comprise an adjustment of slice level of a normalized RF signal.

* * * * *